(12) United States Patent
Takagi

(10) Patent No.: US 12,236,598 B2
(45) Date of Patent: Feb. 25, 2025

(54) IMAGING SUPPORT APPARATUS, RADIATION IMAGING SYSTEM, AND STORAGE MEDIUM

(71) Applicant: Konica Minolta, Inc., Tokyo (JP)

(72) Inventor: Tatsuya Takagi, Mitaka (JP)

(73) Assignee: KONICA MINOLTA, INC., Tokyo (JP)

( * ) Notice: Subject to any disclaimer, the term of this patent is extended or adjusted under 35 U.S.C. 154(b) by 168 days.

(21) Appl. No.: 17/143,512

(22) Filed: Jan. 7, 2021

(65) Prior Publication Data

US 2021/0217169 A1 Jul. 15, 2021

(30) Foreign Application Priority Data

Jan. 14, 2020 (JP) ................................. 2020-003511

(51) Int. Cl.
| | | |
|---|---|---|
| *G06T 7/00* | (2017.01) | |
| *G01T 1/08* | (2006.01) | |
| *G06T 5/50* | (2006.01) | |
| *H04N 5/32* | (2023.01) | |

(52) U.S. Cl.
CPC .............. *G06T 7/0014* (2013.01); *G01T 1/08* (2013.01); *G06T 5/50* (2013.01); *H04N 5/32* (2013.01); *G06T 2207/10116* (2013.01); *G06T 2207/20212* (2013.01)

(58) Field of Classification Search
CPC ....... G06T 7/0014; G06T 7/0016; G06T 5/50; G06T 2207/10116; G06T 2207/20212; G06T 2207/10016; G01T 1/08; H04N 5/32; H04N 5/232; H04N 5/23254
See application file for complete search history.

(56) References Cited

U.S. PATENT DOCUMENTS

| | | | | |
|---|---|---|---|---|
| 2013/0156158 A1* | 6/2013 | Noji | ........................ | G16H 50/30 378/62 |
| 2014/0079310 A1* | 3/2014 | Nakatsugawa | ........ | A61B 6/542 382/132 |

(Continued)

FOREIGN PATENT DOCUMENTS

| | | | | |
|---|---|---|---|---|
| CN | 104884126 B | * | 8/2018 | ............. A61B 34/30 |
| CN | 108392214 A | * | 8/2018 | |

(Continued)

OTHER PUBLICATIONS

Office Action/Search Report mailed on Jun. 20, 2023 for the related Japanese Application No. 2020-003511, with a machine translation.

*Primary Examiner* — Kathleen M Broughton
(74) *Attorney, Agent, or Firm* — LUCAS & MERCANTI, LLP

(57) ABSTRACT

An imaging support apparatus that supports imaging by a radiation imaging apparatus which obtains a plurality of frame images by successively performing a plurality of radiation imaging operations to a subject. The imaging support apparatus includes a hardware processor that determines a number of the frame images to be obtained by the radiation imaging apparatus by analyzing one or more initial frame images, each of the initial frame images being an initial frame image obtained early in the radiation imaging operations by the radiation imaging apparatus.

15 Claims, 7 Drawing Sheets

(56) References Cited

U.S. PATENT DOCUMENTS

| | | | | |
|---|---|---|---|---|
| 2015/0103972 A1* | 4/2015 | Bredno | ............... | A61B 6/583 |
| | | | | 378/7 |
| 2015/0306423 A1* | 10/2015 | Bharat | ............... | A61B 8/4218 |
| | | | | 600/1 |
| 2015/0314137 A1* | 11/2015 | Maurer | ............... | A61N 5/1045 |
| | | | | 600/458 |
| 2017/0079610 A1* | 3/2017 | Morf | ............... | A61B 6/4233 |
| 2018/0249977 A1* | 9/2018 | Melman | ............... | A61B 6/06 |
| 2018/0263584 A1* | 9/2018 | Minami | ............... | G06T 5/50 |
| 2018/0277159 A1* | 9/2018 | Taneda | ............... | A61B 6/461 |
| 2019/0217123 A1* | 7/2019 | West | ............... | A61N 5/1031 |

FOREIGN PATENT DOCUMENTS

| | | | | |
|---|---|---|---|---|
| JP | 2007-082907 A | 4/2007 | | |
| JP | 4490627 B2 * | 6/2010 | ............ | A61B 6/027 |
| JP | 2011-152154 A | 8/2011 | | |
| JP | 2012217644 A * | 11/2012 | | |
| JP | 5411418 B2 * | 2/2014 | ............ | A61N 5/1031 |
| WO | 2013/031667 A1 | 3/2013 | | |
| WO | WO-2014129443 A1 * | 8/2014 | ............ | A61B 6/4233 |
| WO | WO-2020173695 A1 * | 9/2020 | ............ | A61B 6/4291 |

* cited by examiner

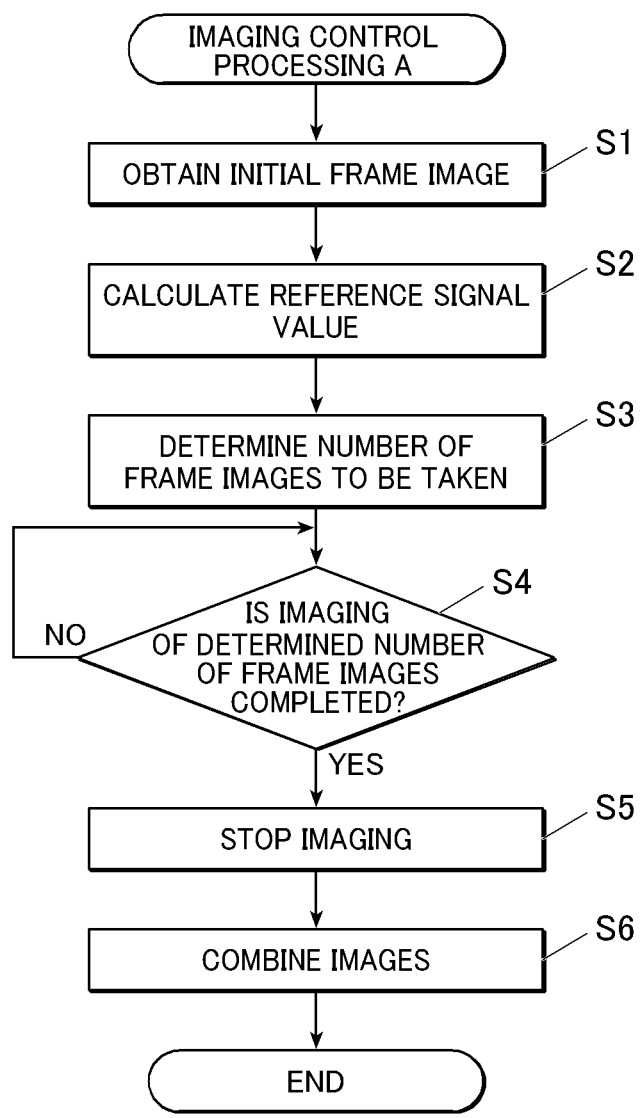

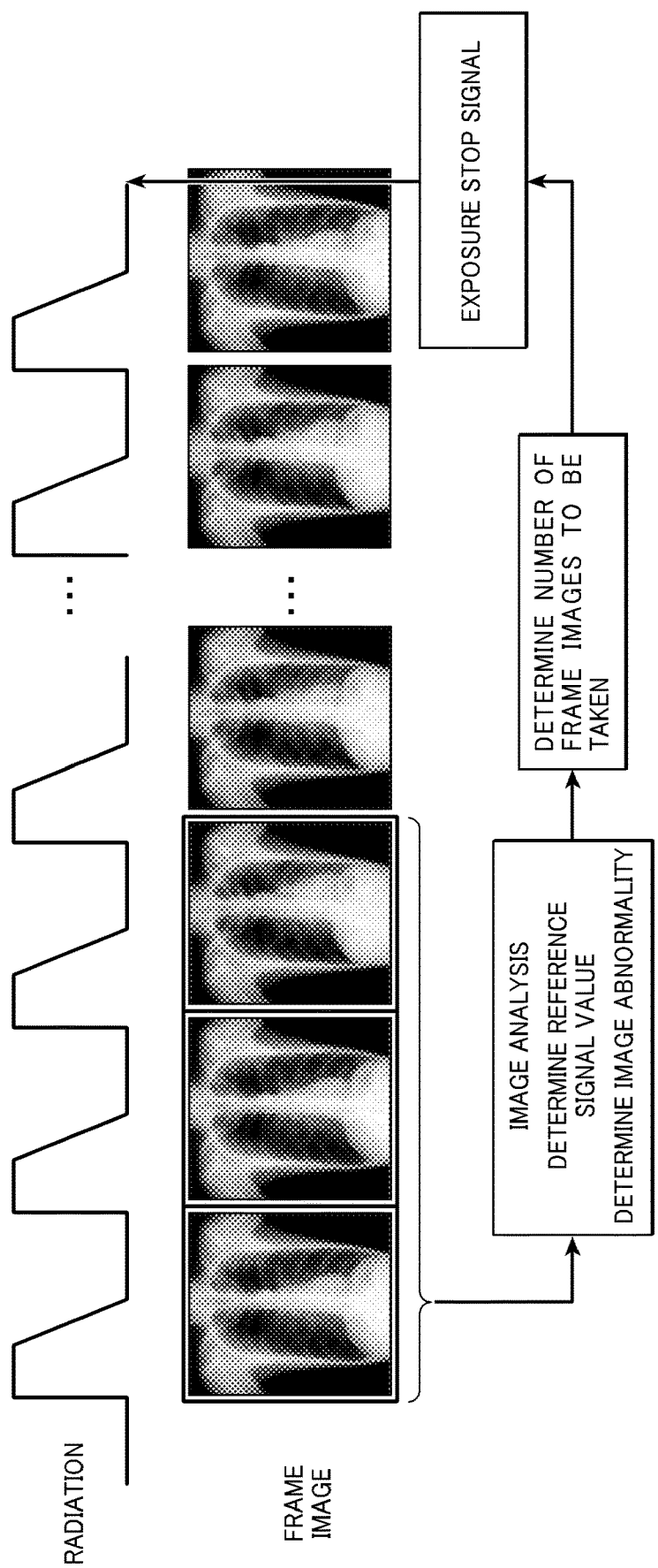

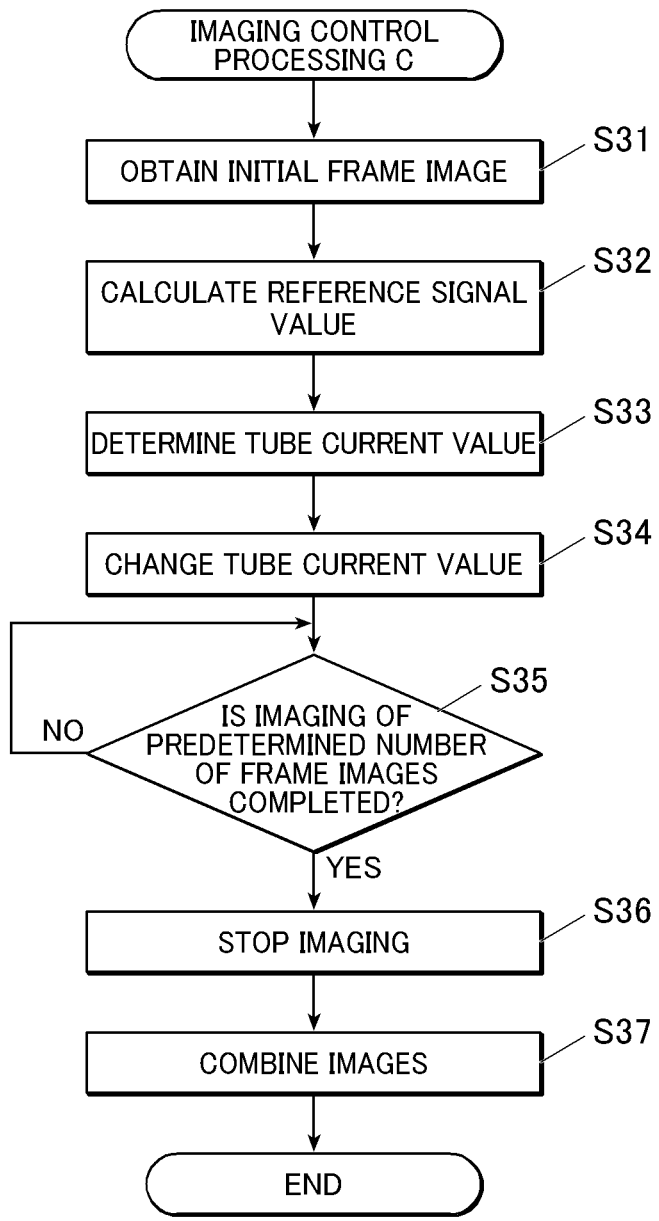

IMAGING SUPPORT APPARATUS, RADIATION IMAGING SYSTEM, AND STORAGE MEDIUM

CROSS-REFERENCE TO RELATED APPLICATIONS

The entire disclosure of Japanese Patent Application No. 2020-003511 filed on Jan. 14, 2020 is incorporated herein by reference in its entirety.

BACKGROUND

Technological Field

The present invention relates to an imaging support apparatus, a radiation imaging system, and a storage medium.

Description of the Related Art

There has been conventionally known a radiation imaging system that performs imaging of a dynamic image of a subject by using a semiconductor image sensor such as an FPD (flat panel detector). To be specific, by using the response rapidness of reading/deleting the image data of the semiconductor image sensor, the radiation imaging system successively emits pulsed radiation from a radiation source in accordance with the timing of reading/deleting of the semiconductor image sensor, and performs radiation imaging a plurality of times per second (referred to as serial imaging), to capture a dynamic state of a subject.

In order to perform imaging at appropriate imaging conditions in such a radiation imaging system, for example, JP 2011-152154 A discloses a technique of performing image analysis of a plurality of dynamic images which was obtained in pre-imaging on the basis of imaging conditions which were determined in advance, calculating the frame rate and the irradiation dose for real imaging, and performing real imaging on the basis of the calculated frame rate and the irradiation dose.

SUMMARY

However, the technique described in JP 2011-152154 A has a problem that the serial imaging needs to be performed twice for pre-imaging and real imaging.

A series of frame images which was obtained by the serial imaging may be used for generating a still image of a high resolution, for example, in addition to observing and analyzing the movement of the subject. In this case, though the still image of the optimum dose cannot be generated unless the number of frame images to be taken is appropriate, JP 2011-152154 A does not describe the determination of the number of frame images to be taken.

The present invention has been made in consideration of the above matters, and an object of the present invention is to enable imaging of the optimum number of frame images without performing pre-imaging when a plurality of frame images is obtained by successively performing radiation imaging to the subject a plurality of times.

To achieve at least one of the abovementioned objects, according to an aspect of the present invention, an imaging support apparatus reflecting one aspect of the present invention is an imaging support apparatus that supports imaging by a radiation imaging apparatus which obtains a plurality of frame images by successively performing a plurality of radiation imaging operations to a subject, the imaging support apparatus including a hardware processor that determines a number of the frame images to be obtained by the radiation imaging apparatus by analyzing one or more initial frame images, each of the initial frame images being an initial frame image obtained early in the radiation imaging operations by the radiation imaging apparatus.

To achieve at least one of the abovementioned objects, according to another aspect of the present invention, a radiation imaging system reflecting one aspect of the present invention is a radiation imaging system, including: a radiation imaging apparatus that obtains a plurality of frame images by successively performing a plurality of radiation imaging operations to a subject; and the above imaging support apparatus.

To achieve at least one of the abovementioned objects, according to another aspect of the present invention, a storage medium reflecting one aspect of the present invention is a non-transitory storage medium storing a computer readable program for a computer in an imaging support apparatus that supports imaging by a radiation imaging apparatus which obtains a plurality of frame images by successively performing a plurality of radiation imaging operations to a subject, the program causing the computer to perform determining that is determining a number of the frame images to be obtained by the radiation imaging apparatus, by analyzing one or more initial frame images obtained early in the radiation imaging operations by the radiation imaging apparatus.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, and wherein:

FIG. 4 is a flowchart showing the flow of imaging control processing A executed by a controller in FIG. 3;

FIG. 6 is a view for explaining the outline of a second embodiment;

FIG. 8 is a flowchart showing the flow of imaging control processing C executed by the controller in FIG. 3; and FIG. 9 is a table showing the signal magnification of each tube voltage value when the signal value of the image taken with the tube voltage value of 80 (kVp) is 1.

DETAILED DESCRIPTION OF EMBODIMENTS

Hereinafter, one or more embodiments of the present invention will be described with reference to the drawings. However, the scope of the invention is not limited to the disclosed embodiments or the illustrated examples.

First Embodiment

Hereinafter, a first embodiment of the present invention will be described.

Figure 1:
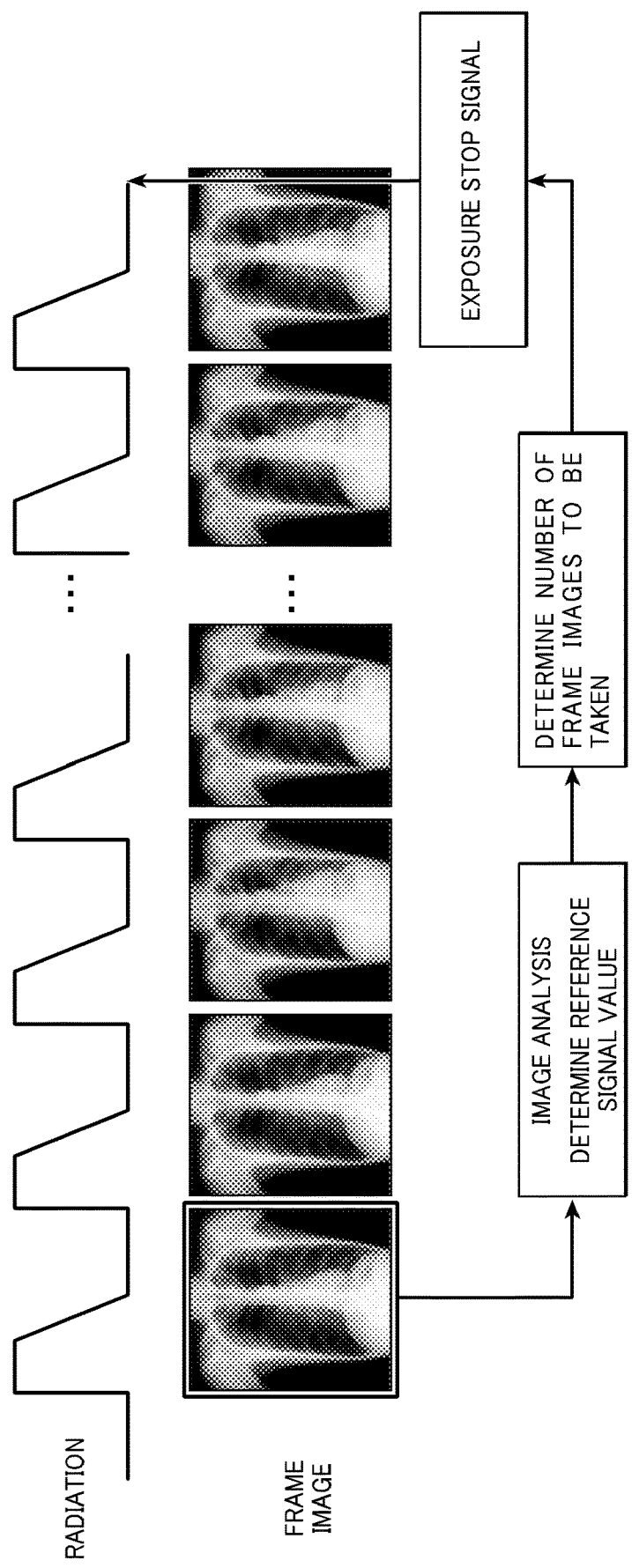
FIG. 1 is a view for explaining the outline of a first embodiment.

FIG. 1 shows the outline of the first embodiment.

Figure 2:
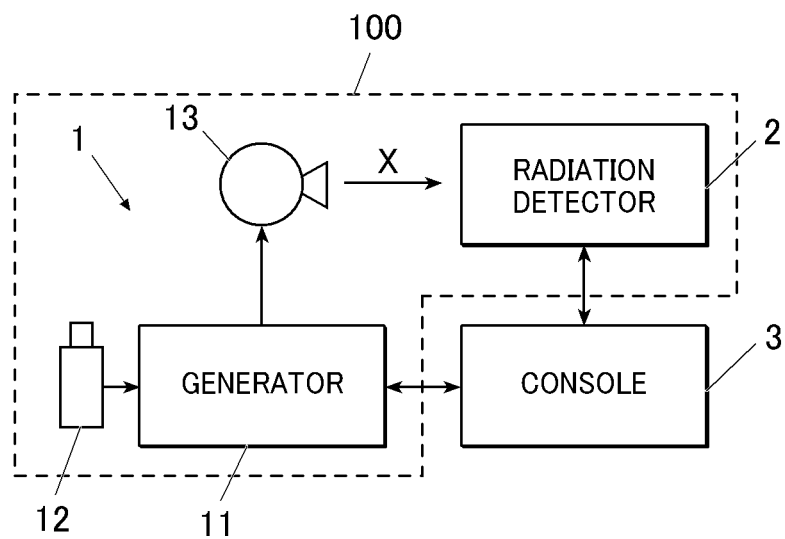
FIG. 2 is a view showing the entire configuration example of a radiation imaging system.

As shown in FIG. 1, in the first embodiment, in the serial imaging of obtaining a plurality of frame images by successively performing pulse irradiation of radiation to a subject, a reference signal value is determined by analyzing a first initial frame image, and the number of frame images to be taken is determined on the basis of the reference signal value. When the imaging of the determined number of frame images is finished, an exposure stop signal is output to the radiation irradiation apparatus to end the imaging Configuration of Radiation Imaging System First, the configuration of a radiation imaging system according to an embodiment(s) will be described. FIG. 2 is a block diagram showing the configuration of a radiation imaging system 100.

As shown in FIG. 2, the radiation imaging system 100 of this embodiment includes a radiation irradiation apparatus 1, a radiation detector 2, and a console 3. The radiation irradiation apparatus 1 and the radiation detector 2 form a radiation imaging apparatus of the present invention.

The radiation imaging system 100 can be connected to a radiology information system (RIS), a picture archiving and communication system (PACS), and so forth (all not shown).

The radiation irradiation apparatus 1 can be communicably connected to the console 3 by wire or wirelessly.

The radiation irradiation apparatus 1 includes a generator 11, an exposure switch 12, and a radiation source 13.

The generator 11 applies a voltage in accordance with preset radiation irradiation conditions (tube voltage, tube current, irradiation time (mAs value), etc.) to the radiation source 13 in response to the exposure switch 12 being operated.

The radiation source 13 (bulb) includes a rotating anode and a filament (both not shown). When the generator 11 applies the voltage to the radiation source 13, the filament emits an electron beam corresponding to the applied voltage to the rotating anode, and the rotating anode generates radiation X (X-rays, etc.) of a dose corresponding to the intensity of the electron beam.

Although FIG. 2 shows the components 11 to 13 that separate from one another, they may be unitized.

Further, although FIG. 2 shows the exposure switch 12 connected to the generator 11, the exposure switch 12 may be provided in/on another apparatus (e.g. a not-shown console).

The radiation irradiation apparatus 1 may be installed in an imaging room, or combined with a nursing cart or the like to be movable.

The radiation detector 2 is communicably connected to the console 3 by wire or wirelessly.

Though not shown in the drawings, the radiation detector 2 includes a substrate two-dimensionally (in a matrix) arranging pixels including radiation detecting elements that generate electric charges corresponding to the dose by receiving radiation and switch elements that charge and release electric charges, a scanning circuit that switches on/off of each of the switch elements, a reading circuit that reads out as signals values the amounts of electric charges released from the respective pixels, a controller that generates a radiation image from a plurality of signal values read out by the reading circuit, an output section that outputs the generated radiation image data and the like outside, and the like.

The radiation detector 2 generates radiation images (frame images) corresponding to emitted radiation in synchronization with the timings when the radiation is emitted from the radiation irradiation apparatus 1.

The radiation detector 2 may be, what is called, an indirect radiation detector that includes a scintillator, and converts received radiation with the scintillator into light having another wavelength, such as visible light, and generates electric charges corresponding to the light, into which the radiation has been converted, or may be, what is called, a direct radiation detector that directly generates electric charges from received radiation without a scintillator or the like.

The radiation detector 2 may be integrated with an imaging table (dedicated type), or may be portable (cassette type).

The console 3 functions as an imaging support apparatus of the present invention. The console 3 is constituted of a PC, a portable terminal, or a dedicated apparatus, and is communicably connected to the radiation irradiation apparatus 1, the radiation detector 2, and/or the like by wire or wirelessly.

On the basis of an imaging order from an external apparatus (RIS, etc.) or on the basis of user operations, the console 3 can set imaging conditions, an imaging target part(s) (part(s) of a subject to be photographed), and so forth into the radiation irradiation apparatus 1 and the radiation detector 2, and the console 3 can also control the imaging by the radiation irradiation apparatus 1 and the radiation detector 2.

Figure 3:
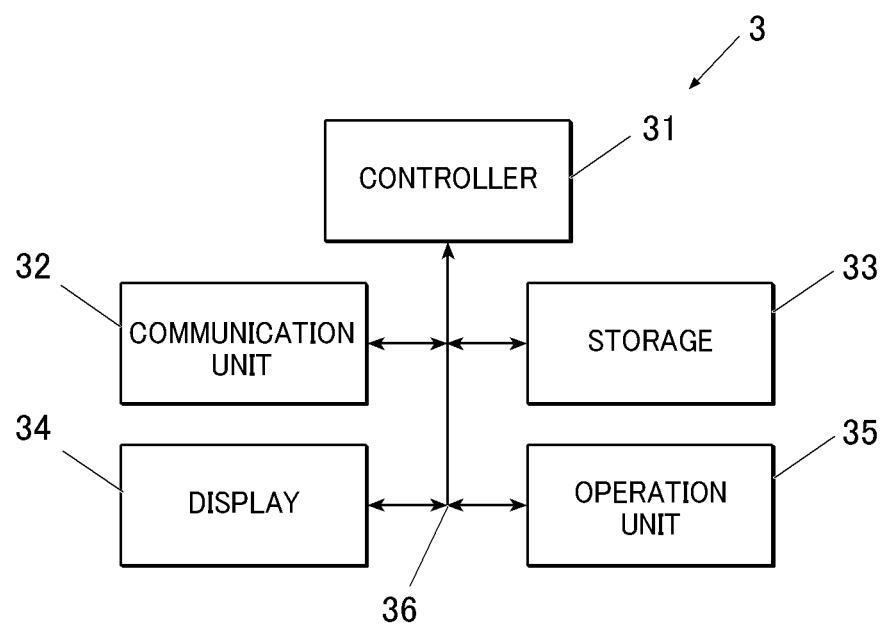
FIG. 3 is a block diagram showing the functional configuration of a console in FIG. 2.

As shown in FIG. 3, the console 3 includes a controller 31 (hardware processor), a communication unit 32, a storage 33, a display 34, an operation unit 35, and a bus 36 that connects the components 31 to 35 with one another.

The controller 31 includes a central processing unit (CPU) and a random access memory (RAM). In response to operations on/with the operation unit 35, the CPU of the controller 31 reads various programs stored in the storage 33, loads the read programs into the RAM, and performs various processes in accordance with the loaded programs, thereby centrally controlling operation of each component of the console 3.

The communication unit 32 includes a LAN adapter, a modem, and a terminal adapter (TA), and controls data sending to and data receiving from apparatuses connected to a communication network(s).

The storage 33 includes a nonvolatile semiconductor memory and/or a hard disk, and stores various programs that are executed by the controller 31, parameters that are required to perform processes in accordance with the programs, and so forth.

The storage 33 can also store image data of a frame image received from the radiation detector 2 and image data processed by the controller 31 so as to be associated with accompanying information.

The display 34 is constituted of a monitor, such as a liquid crystal display (LCD) or a cathode ray tube (CRT), and displays instructions input from the operation unit 35, data, and so forth in accordance with instructions of display signals input from the controller 31.

The operation unit 35 includes: a keyboard including cursor keys, number input keys, and various function keys; and a pointing device, such as a mouse, and outputs, to the controller 31, instruction signals input by a user operating the keys of the keyboard or the mouse.

The operation unit 35 may have a touch panel on the display screen of the display 34. In this case, the operation unit 35 outputs, to the controller 31, instruction signals input via the touch panel.

[Operation of Radiation Imaging System]

Next, the operation in the radiation imaging system will be described.

FIG. 4 is a flowchart showing imaging control processing A executed by the controller 31 of the console 3. The imaging control processing A is executed by the cooperation between the controller 31 and a program stored in the storage 33 when a predetermined starting condition is met (for example, when a start operation is performed to the operation unit 35, when the exposure switch 12 is pressed, or the like).

Though the following description is made for a chest as a subject as an example, the subject is not limited to this. The frame images which were obtained by the imaging in the radiation detector 2 are sequentially transmitted to the console 3.

First, the controller 31 obtains the frame image (initial frame image) which was taken first in the serial imaging, from the radiation detector 2 via the communication unit 32 (step S1).

The controller 31 next calculates a reference signal value from the received initial frame image (step S2).

For example, the controller 31 sets a region of interest in the initial frame image and calculates, as a reference signal value, a representative value (average value, median value, highest value, lowest value or the like) of the signal values (pixel values) in the region of interest.

When the initial frame image is a chest image, the controller 31 sets the pulmonary region or the region surrounding the outline of pulmonary region in a rectangle as the region of interest, and calculates the representative value of signal values in the region of interest as the reference signal value. As for the pulmonary region, for example, a threshold value is obtained by a discriminant analysis from a histogram of the signal value of each pixel, and the region of signals higher than the threshold value is primarily extracted as a pulmonary region candidate. Next, the edge detection is performed around the border of the pulmonary region candidate which was primarily extracted, the spots having the maximum edges in sub-regions around the border are extracted along the border, and thereby the border of pulmonary region can be extracted.

Next, the controller 31 determines the number of frame images to be taken on the basis of the reference signal value (step S3).

For example, the number of frame images to be taken is determined by the following Formula (1).

(number of frame images to be taken)=(target reference signal value)/(reference signal value of initial frame image)  Formula (1):

The target reference signal value corresponds to a representative value of signal values in the region of interest when the dose emitted to the region of interest is a predetermined target dose. The target reference signal value is obtained experimentally in advance and stored in the storage 33.

In step S3, the number of frame images to be taken may be determined on the basis of an index value that is calculated on the basis of the reference signal value.

As the index value, for example, Exposure Index (hereinafter, referred to as EI) or an S value can be used.

The EI is an index which is proposed by the International Electrotechnical Commission (IEC) in order to standardize the imaging dose of the digital radiation imaging system. The EI can be calculated by the following Formula (2).

$$EI = C_0 \times g(V)$$

In the above Formula (2), $C_0=100\mu Gy^{-1}$. The g(V) is a calibration inverse function and defined for each apparatus (or system). The V is a representative value (reference signal value) of the image.

When the EI is used, the controller 31 can determine the number of frame images to be taken by the following Formula (3).

(number of frame images to be taken)=(target EI)/(EI of initial frame image)  Formula (3):

In the above Formula (3), the target EI is the EI which is calculated from the representative value of signal values in the region of interest (average value in the region of interest, or the like) when the dose emitted inside the region of interest is a predetermined target dose. The target EI is obtained experimentally in advance and stored in the storage 33.

The S value is a sensitivity index for stabilizing the density of each imaging part of the digital radiation imaging system. The S value is used in normalization processing for correcting the change of X-ray dose reaching the radiation detector 2 caused by the variation in body shape of the subject, radiation irradiation condition, and the like. To obtain the S value, the highest value SH and the lowest value SL of the signal value x in the region of interest are obtained as the reference signal value.

Figure 5A:
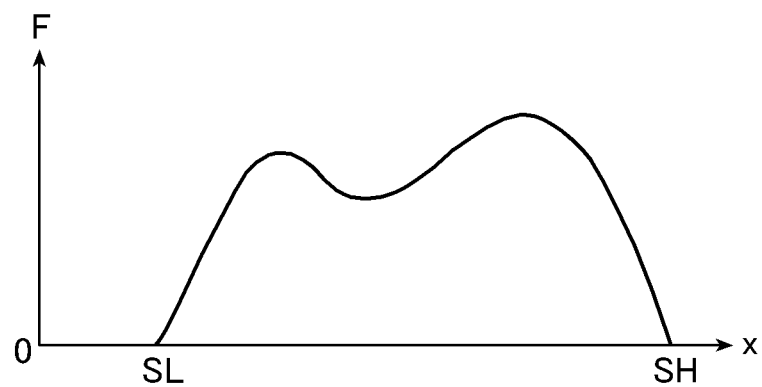
FIGS. 5A and 5B are views for explaining how to calculate an S value.
Figure 5B:
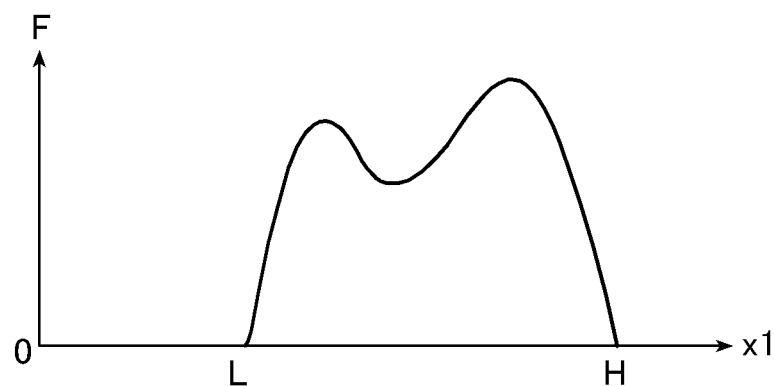

In the normalization processing, when the distribution of signal value x is the distribution as shown in FIG. 5A (vertical axis is frequency F), as shown in FIG. 5B, for example, the signal value x is converted into the normalized signal value x1 in accordance with the following Formula (4) so that the highest value SH and the lowest value SL respectively become the highest value H and the lowest value L which are determined in advance.

$$x1 = G \times x + S$$  Formula (4):

From the above relationship, H=G×SH+S, and L=G×SL+S are satisfied. Thus, the S value can be calculated by the following Formulas (5).

$$S \text{ value} = (L \times SH - H \times SL)/(SH - SL)$$  Formula (5):

When the S value is used, the controller 31 determines the number of frame images to be taken by the following Formula (6).

(number of frame images to be taken)=(S value of initial frame image)/(target S value)  Formula (6):

In the above Formula (6), the target S value is the S value which is calculated from the highest value and the lowest value of signal values in the region of interest when the dose of radiation emitted to the region of interest is the target dose which is determined in advance. The target S value is obtained experimentally in advance and stored in the storage 33.

The controller 31 next determines whether or not the imaging of the number of frame images which was determined in step S3 has completed (step S4).

For example, the controller 31 counts the number of imaging (the number of frame images received from the radiation detector 2) from start of the imaging, and determines whether or not the imaging of the number of frame images determined in step S3 has completed.

If the controller 31 determines that the imaging of the number of frame images determined in step S3 has not completed (step S4; NO), the controller 31 waits until the imaging of the number of frame images determined in step S3 has completed.

If the controller 31 determines that the imaging of the number of frame images determined in step S3 has completed (step S4; YES), the controller 31 controls the generator 11 and the radiation detector 2 (transmits an exposure stop signal) to stop the imaging (step S5).

The controller 31 then combines a plurality of frame images obtained by the imaging to generate a single still image (step S6), and ends the imaging control processing A.

In step S6, for example, the controller 31 performs super-resolution processing by using the obtained series of frame images, and generates a single still image of a high resolution.

The super-resolution processing is processing of generating a still image (that is, a still image of a high resolution) which has a resolution higher than the resolution of each frame image, by referring to pixel information of a plurality of frame images. The specific method of the super-resolution processing is not particularly limited. For example, any known method such as the following References 1 and 2 may be used (Reference 1: Dennis, Mitzel. "Video Super Resolution using Duality Based TV-L1 Optical Flow." 2009 in DAGM-Symposium, Reference 2: Nobu, Aoki. "Super Resolution Processing by Plurality of Pieces of Digital Image Data." Ricoh Technical Report No. 24, November, 1998).

Alternatively, a single still image may be generated by aligning the position of the subject between the series of frame images and adding the signal values of the corresponding pixels.

The generated still image is stored in the storage 33 so as to be associated with patient information and test information.

In such a way, in a first embodiment, when the serial imaging is performed, a reference signal value is determined from the initial frame image, and the number of frame images to be taken in the serial imaging is determined by using the determined reference signal value, to control the imaging. Thus, it is possible to perform imaging of the optimum number of frame images without performing pre-imaging.

Second Embodiment

Hereinafter, a second embodiment of the present invention will be described.

FIG. 6 shows the outline of the second embodiment.

As shown in FIG. 6, in the second embodiment, in the serial imaging of successively performing pulse irradiation of radiation to the subject and obtaining a plurality of frame images, an initial frame image group of n frame images (n is two or three, for example) which were obtained early in the imaging is analyzed to determine a reference signal value, and the number of frame images to be taken is determined on the basis of the reference signal value. When the imaging of the determined number of frame images is finished, the exposure stop signal is output to the radiation irradiation apparatus to end the imaging. Furthermore, in the second embodiment, the image abnormality is determined by analyzing the initial frame image group, and when the initial frame image group is determined to have an abnormality, the exposure stop signal is output to the radiation irradiation apparatus to end the imaging.

Since the system configuration in the second embodiment is similar to the system configuration in the first embodiment, the explanation is omitted. Hereinafter, the operation in the second embodiment will be described.

Figure 7:
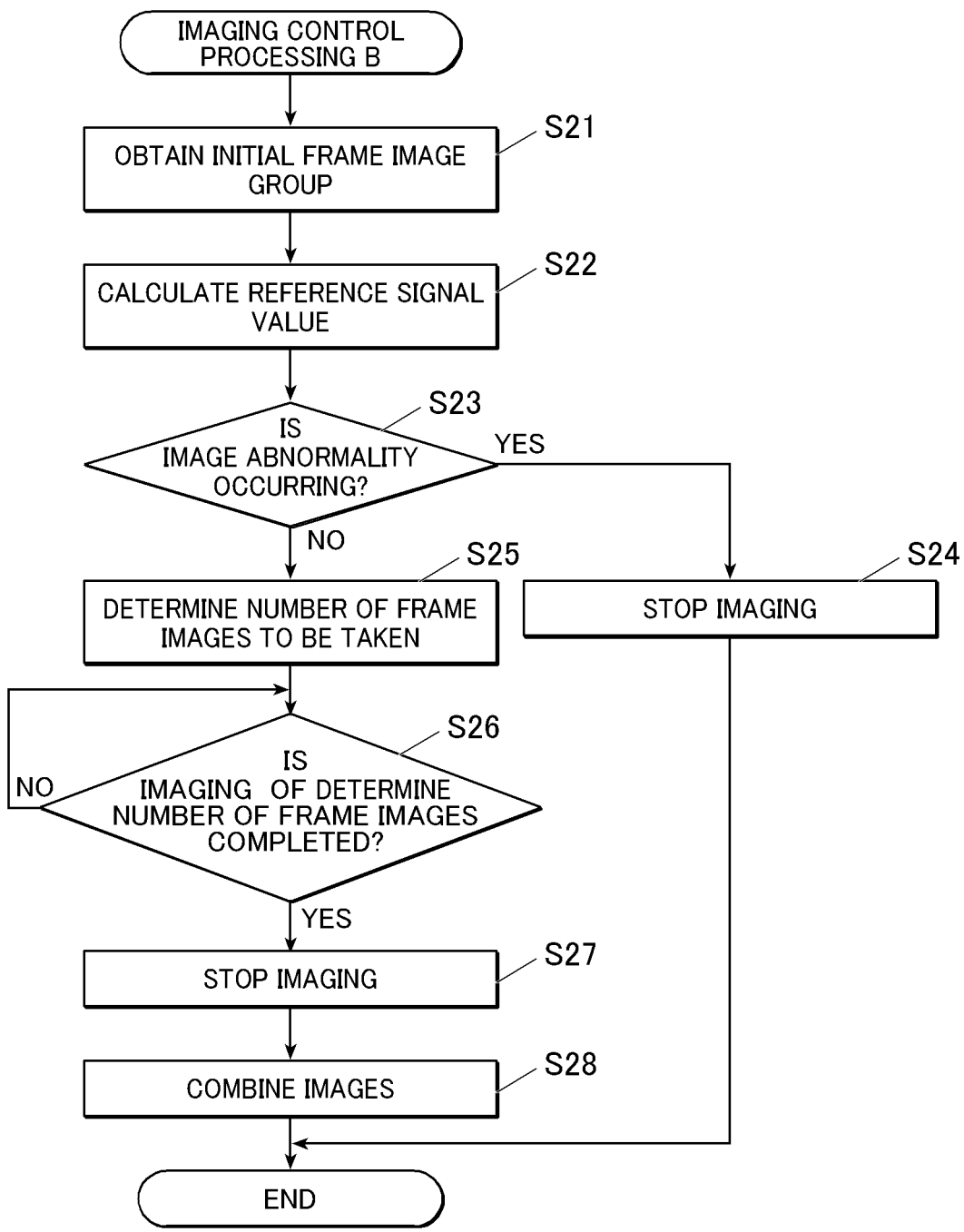
FIG. 7 is a flowchart showing the flow of imaging control processing B executed by the controller in FIG. 3.

FIG. 7 is a flowchart showing imaging control processing B executed by the controller 31 of the console 3 in the second embodiment. The imaging control processing B is executed by the cooperation between the controller 31 and a program stored in the storage 33 when a predetermined starting condition is met (for example, when a start operation is made to the operation unit 35, when the exposure switch 12 is pressed, or the like).

The controller 31 first obtains the frame image group of the first n (for example, two or three) frame images (initial frame image group) taken in the serial imaging, from the radiation detector 2 via the communication unit 32 (step S21).

The controller 31 then calculates a reference signal value from the received initial frame image group (step S22).

For example, the controller 31 sets the region of interest in each frame image of the initial frame image group, and calculates the representative value (average value, highest value, lowest value, or the like) of the signal values (pixel vales) in the region of interest. The average value or the median value of the representative values calculated from the respective frame images is set to be the reference signal value.

Next, the controller 31 determines whether or not the image abnormality is occurring (step S23).

For example, the controller 31 obtains a difference in signal value of each pixel between two frame images in the initial frame image group. If the representative value (for example, average value, total, highest value, or the like) of absolute values of the difference values is a predetermined threshold value or more, the controller 31 determines that the image abnormality of a body movement or the like is occurring. The two frame images for which the difference is calculated may be adjacent two frame images or may be the frame image which was taken earliest in the initial frame image group and the frame image which was taken latest.

If the controller 31 determines that the image abnormality is occurring (step S23; YES), the controller 31 controls the generator 11 and the radiation detector 2 to stop the imaging (step S24), and ends imaging control processing B.

If the controller 31 determines that the image abnormality is not occurring (step S23; NO), the controller 31 determines the number of frame images to be taken on the basis of the reference signal value (step S25).

Since the process of step S25 is similar to the process described in step S3 of FIG. 4, the description thereof is omitted.

The controller 31 then determines whether or not the imaging of the number of frame images determined in step S25 has completed (step S26).

For example, the controller 31 counts the number of imaging from start of the imaging (the number of frame images received from the radiation detector 2), and determines whether or not the imaging of the number of frame images determined in step S25 has completed.

If the controller 31 determines that the imaging of the number of frame images determined in step S25 has not completed (step S26; NO), the controller 31 waits until the imaging of the number of frame images determined in step S25 has completed.

If the controller 31 determines that the imaging of the number of frame images determined in step S25 has completed (step S26; YES), the controller 31 controls the generator 11 and the radiation detector 2 to stop the imaging (step S27).

The controller 31 combines the plurality of frame images obtained by the imaging and generates a single still image (step S28), and ends imaging control processing B.

Since the process in step S28 is similar to the process in step S6 of FIG. 4, the description is omitted. The generated still image is stored in the storage 33 so as to be associated with patient information and test information.

In such a way, in the second embodiment, when the serial imaging is performed, the reference signal value is determined from the initial frame image group, and the number of frame images to be taken in the serial imaging is determined by using the determined reference signal value to control imaging. Thus, it is possible to perform imaging of the optimum number of frame images without performing pre-imaging. When the initial frame image group is analyzed to determine whether or not the image abnormality is occurring and it is determined that the image abnormality is occurring, the radiation irradiation apparatus 1 and the radiation detector 2 are controlled to stop the imaging. Thus, it is possible to prevent the unnecessary imaging from continuing.

Third Embodiment

Hereinafter, a third embodiment of the present invention will be described.

The first embodiment and the second embodiment have been described for an example of determining the number of frame images to be taken by analyzing the initial frame image (group) which was obtained early in the serial imaging. However, the third embodiment is described for an example of analyzing the frame image (group) and determining the imaging condition such as a tube current value or the like when the number of initial frame images to be taken is determined in advance.

Since the system configuration in the third embodiment is similar to the system configuration described in the first embodiment, the description thereof is omitted. Hereinafter, the operation of the third embodiment will be described.

FIG. 8 is a flowchart showing imaging control processing C executed by the controller 31 of the console 3 in the third embodiment. The imaging control processing C is executed by the cooperation between the controller 31 and a program stored in the storage 33 when a predetermined starting condition is met (for example, when a start operation is made to the operation unit 35, when the exposure switch 12 is pressed, or the like).

The controller 31 obtains the frame image (initial frame image) which was obtained first in the serial imaging from the radiation detector 2 via the communication unit 32 (step S31).

The controller 31 calculates a reference signal value from the received initial frame image (step S32).

Since the process in step S32 is similar to the process in step S2 of FIG. 4, the description thereof is omitted.

The controller 31 determines the tube current value (mA) on the basis of the reference signal value (step S33).

The tube current value (mA) can be determined by the following Formula (7).

tube current value (mA)=(target reference signal value)±(reference signal value of initial frame image)±(number of frame images to be taken)    Formula (7):

The tube current value may be calculated by using the EI or the S value calculated on the basis of the reference signal value, as shown in the following Formulas (8) and (9).

tube current value (mA)=target EI(EI of initial frame image)±(number of frame images to be taken)    Formula (8):

tube current value (mA)=($S$ value of initial frame image)±(target $S$ value)±(number of frame images to be taken)    Formula (9):

The controller 31 notifies the determined tube current value to the generator 11 to change the tube current value and perform imaging (step S34).

The controller 31 determines whether or not the imaging of the number of frame images determined in advance has completed (step S35).

For example, the controller 31 counts the number of imaging from start of the imaging (the number of frame images received from the radiation detector 2), and determines whether or not the imaging of the number of frame images determined in advance has completed. The number of imaging performed after the change of tube current value may be counted.

If the controller 31 determines that the imaging of the number of frame images determined in advance has not completed (step S35; NO), the controller 31 waits until the imaging of the number of frame images determined in advance has completed.

If the controller 31 determines that the imaging of the number of frame images determined in advance has completed (step S35; YES), the controller 31 controls the generator 11 and the radiation detector 2 to stop the imaging (step S36).

The controller 31 combines the plurality of frame images obtained in the imaging to generate a single still image (step S37), and ends the imaging control processing C.

Since the process in step S37 is similar to the process described in step S6 of FIG. 4, the description thereof is omitted. The generated still image is stored in the storage 33 so as to be associated with the patient information and the test information.

In such a way, in the third embodiment, when the serial imaging is performed, the reference signal value is determined from the initial frame image, and the tube current value (mA) in the serial imaging is determined by using the determined reference signal value to control the imaging. Thus, it is possible to perform imaging with the optimum tube current value without performing pre-imaging.

The imaging control processing C shown in FIG. 8 has been described that the reference signal value is obtained from a single initial frame image and the tube current value (mA) is determined on the basis of the reference signal value. However, the tube current value may be determined by obtaining the reference signal value from a plurality of initial frame images (initial frame image group) as in the second embodiment. Similarly to the second embodiment, whether or not the image abnormality is occurring may be determined on the basis of the initial frame image group, and the imaging may be stopped when the image abnormality occurs.

When the number of frame images to be taken and the tube current value (mA) are determined in advance, the controller 31 may determine the tube voltage value (kVp) instead of the tube current value (mA) by analyzing the initial frame image (group), notify the determined tube voltage value to the generator 11, and continue the imaging with the changed tube voltage value.

The K is first calculated by Formula (10) to determine the tube voltage value.

K=(target reference signal value)±(reference signal value of initial frame image)    Formula (10):

K may be calculated by using EI or S value.

Tables are stored for respective body thicknesses in the storage 33, and each of the tables shows a signal magnification of each tube voltage value when the signal value of the image taken with the tube voltage value of 80 (kVp) is 1. The controller 31 refers to a table for the body thickness of the subject among the tables, and determines the tube voltage value corresponding to the signal magnification closest to K as the tube voltage value used in the imaging. The table shown in FIG. 9 is obtained experimentally.

Though the description is made for, as an example, taking the initial frame image with the tube voltage value of 80 (kVp), the initial frame image may be taken with another tube voltage value. When the initial frame image is taken with the another tube voltage value, the storage 33 may store the table showing the signal magnification of each tube voltage value when the signal value of the image taken with the tube voltage value to take the initial frame image is 1.

In such a way, when the serial imaging is performed, the reference signal value is determined from the initial frame image, and the tube voltage value (kVp) in the serial imaging is determined by using the determined reference signal value to control the imaging. Thus, it is possible to perform the imaging with the optimum tube voltage value without performing pre-imaging.

When the number of frame images to be taken and the tube current value (mA) are determined in advance, the controller 31 may analyze the initial frame image (group), determine the frame rate (fps) instead of the tube current value (mA), and notify the determined frame rate to the generator 11 and the radiation detector 2, to continue the imaging with the changed frame rate.

The frame rate can be calculated by Formula (11).

frame rate=(initial frame rate)×(target reference signal value)±(reference signal value of initial frame image)±(number of frame images to be taken)   Formula (11):

The initial frame rate is the frame rate which was set at the time of taking the initial frame image. The frame rate may be calculated by using the EI or S value.

In such a way, when the serial imaging is performed, the reference signal value is determined from the initial frame image, and the frame rate (fps) in the serial imaging is determined by using the determined reference signal value to control the imaging. Thus, it is possible to perform imaging with the optimum frame rate without performing pre-imaging.

As described above, the controller 31 of the console 3 determines the number of frame images to be obtained in the radiation imaging apparatus by analyzing one or more initial frame images obtained early in a plurality of radiation imaging operations by the radiation imaging apparatus (radiation irradiation apparatus and a radiation detector).

Accordingly, when a plurality of frame images is obtained by successively performing radiation imaging to the subject a plurality of times, it is possible to perform imaging of the optimum number of frame images without performing pre-imaging.

The controller 31 determines the number of frame images such that the total dose of irradiation doses of the region of interest in the plurality of frame images is the target dose by analyzing the initial frame image. Thus, it is possible to perform imaging of the number of frame images that makes the total dose of irradiation doses of the region of interest in the plurality of frame images be the target dose.

The controller 31 determines whether or not the determined number of frame images were obtained by the radiation imaging apparatus. If the controller 31 determines that the determined number of frame images were obtained by the radiation imaging apparatus, the controller 31 causes the radiation imaging apparatus to stop the imaging. Thus, it is possible to prevent the imaging of frame images more than the determined number of frame images.

The controller 31 determines whether or not an image abnormality is occurring by analyzing the initial frame image group. If the controller 31 determines that the image abnormality is occurring, the controller 31 causes the radiation imaging apparatus to stop the imaging. Thus, it is possible to prevent unnecessary imaging in a state in which the image abnormality is occurring.

For example, the controller 31 calculates the difference value of signal values between two initial frame images, and determines whether or not the image abnormality is occurring on the basis of whether or not the representative value of the absolute value of the calculated difference value exceeds a threshold value that was determined in advance. Thus, it is possible to determine that the image abnormality is occurring when the subject moves largely.

The controller 31 generates a single still image by combining a plurality of frame images obtained by the radiation imaging apparatus. Thus, it is possible to generate the still image by using the optimum number of frame images.

The description of the above embodiment is merely a preferred example of a radiation imaging system and an imaging support apparatus according to the present invention, and the present invention is not limited to this.

For example, the above embodiment has been described as successively performing pulse irradiation of radiation to the subject, to obtain a plurality of frame images. However, radiation may be continuously emitted at a low dose rate without interruption to obtain a plurality of frame images.

The above description describes an example using a nonvolatile semiconductor memory or a hard disk as a computer readable medium storing a program for executing each processing. However, the medium is not limited to this example. A portable storage medium such as a CD-ROM can be applied as another computer readable medium. A carrier wave may be applied as a medium that provides program data via a communication line.

As for other detailed configurations and detailed operations of the apparatuses forming the radiation imaging system, modifications can be made as needed within the scope of the present invention.

Although embodiments of the present invention have been described and illustrated in detail, the disclosed embodiments are made for purposes of illustration and example only and not limitation. The scope of the present invention should be interpreted by terms of the appended claims

What is claimed is:

1. An imaging support apparatus that supports imaging by a radiation imaging apparatus which obtains a plurality of frame images by successively performing a plurality of radiation imaging operations to a subject, the imaging support apparatus comprising:
a hardware processor that determines a reference signal value of one or more initial frame images during the imaging by the radiation imaging apparatus, calculates a normalized reference signal value on the basis of a sensitivity index, and determines a number of the plurality of frame images to be obtained by the radiation imaging apparatus based on the normalized reference signal value of the one or more initial frame images, each of the initial frame images being an initial frame image obtained early in the radiation imaging operations by the radiation imaging apparatus,
wherein the reference signal value is determined based on an average value, a median value, a highest value, or a lowest value of pixel signal values in a region of interest of the one or more initial frame images, and
wherein the hardware processor determines the number of the frame images to be obtained while the plurality of frame images are being obtained by the radiation imaging apparatus.

2. The imaging support apparatus according to claim 1, wherein the hardware processor determines the number of the frame images such that a total dose of irradiation doses of a region of interest in the frame images becomes a target dose, by analyzing the one or more initial frame images.

3. The imaging support apparatus according to claim 1, wherein
the hardware processor determines whether or not the determined number of the frame images are obtained by the radiation imaging apparatus, and
the hardware processor causes the radiation imaging apparatus to stop the imaging in response to determination that the determined number of the frame images are obtained by the radiation imaging apparatus.

4. The imaging support apparatus according to claim 3, wherein
the hardware processor determines whether or not an image abnormality is occurring by analyzing two or more initial frame images, each of the initial frame images being the initial frame image, and
the hardware processor causes the radiation imaging apparatus to stop the imaging in response to determination that the image abnormality is occurring.

5. The imaging support apparatus according to claim 4, wherein the hardware processor calculates a difference value between signal values of the two or more initial frame images, and determines whether or not the image abnormality is occurring based on whether or not a representative value of an absolute value of the calculated difference value exceeds a threshold value that is determined in advance.

6. The imaging support apparatus according to claim 1, wherein the hardware processor generates a single still image by combining the frame images obtained by the radiation imaging apparatus.

7. The imaging support apparatus according to claim 1, wherein the each of the one or more initial frame images is a chest image and the hardware processor sets a pulmonary region or a region surrounding an outline of the pulmonary region as the region of interest.

8. The imaging support apparatus according to claim 7, wherein the hardware processor is configured to determine the region of interest by obtaining a threshold value from a histogram of signal values of each pixel, and extracting regions of signals higher than the threshold value as a pulmonary region candidate.

9. The imaging support apparatus according to claim 1, wherein the reference signal value includes a highest value and a lowest value of signal values in a region of interest of the one or more initial frame images.

10. The imaging support apparatus according to claim 1, wherein the imaging is radiological imaging.

11. The imaging support apparatus according to claim 1, wherein the initial frame image obtained early in the radiation imaging operations by the radiation imaging apparatus is part of the plurality of frame images obtained by the radiation imaging apparatus by successively performing a plurality of radiation imaging operations, and the hardware processor determines the reference signal value while the radiation imaging apparatus continues obtaining the plurality of frame images by successively performing the plurality of radiation imaging operations.

12. The imaging support apparatus according to claim 1, wherein the sensitivity index is based on a highest value and a lowest value of the pixel signal values in the region of interest.

13. The imaging support apparatus according to claim 1, wherein the sensitivity index is calculated so that a highest value and a lowest value of the pixel signal values in the region of interest respectively become a predetermined standard high value and a predetermined standard low value.

14. A radiation imaging system, comprising:
a radiation imaging apparatus that obtains a plurality of frame images by successively performing a plurality of radiation imaging operations to a subject; and
the imaging support apparatus according to claim 1.

15. A non-transitory storage medium storing a computer readable program for a computer in an imaging support apparatus that supports imaging by a radiation imaging apparatus which obtains a plurality of frame images by successively performing a plurality of radiation imaging operations to a subject, the program causing the computer to perform determining a reference signal value of one or more initial frame images during the imaging by the radiation imaging apparatus, calculating a normalized reference signal value on the basis of a sensitivity index, and determining a number of the plurality of frame images to be obtained by the radiation imaging apparatus based on the normalized reference signal value of the one or more initial frame images obtained early in the radiation imaging operations by the radiation imaging apparatus,
wherein the reference signal value is determined based on an average value, a median value, a highest value, or a lowest value of pixel signal values in a region of interest of the one or more initial frame images, and
wherein the hardware processor determines the number of the frame images to be obtained while the plurality of frame images are being obtained by the radiation imaging apparatus.

* * * * *